United States Patent
Hediger

(10) Patent No.: US 9,302,359 B2
(45) Date of Patent: Apr. 5, 2016

(54) CLAMPING FIXTURE

(71) Applicant: Erowa AG, Reinach (CH)

(72) Inventor: Hans Hediger, Reinach (CH)

(73) Assignee: Erowa AG, Reinach (CH)

( * ) Notice: Subject to any disclaimer, the term of this patent is extended or adjusted under 35 U.S.C. 154(b) by 266 days.

(21) Appl. No.: 14/031,179

(22) Filed: Sep. 19, 2013

(65) Prior Publication Data

US 2015/0054211 A1 Feb. 26, 2015

(30) Foreign Application Priority Data

Aug. 20, 2013 (CH) ........................................ 1421/13

(51) Int. Cl.
*B23Q 3/06* (2006.01)
*B23Q 1/00* (2006.01)

(52) U.S. Cl.
CPC ................ *B23Q 3/06* (2013.01); *B23Q 1/0072* (2013.01)

(58) Field of Classification Search
CPC ................................ B23Q 1/0072; B23Q 3/06
USPC ........................................................ 269/309
See application file for complete search history.

(56) References Cited

U.S. PATENT DOCUMENTS

| 4,662,043 | A  | * | 5/1987  | Stone et al.  | 29/33 P   |
| 5,415,384 | A  | * | 5/1995  | Obrist et al. | 269/309   |
| 6,170,836 | B1 | * | 1/2001  | Etter         | 279/4.06  |
| 8,061,717 | B2 | * | 11/2011 | Roth          | 279/2.12  |
| 8,152,151 | B2 | * | 4/2012  | Sandmeier     | 269/309   |
| 2003/0168795 | A1 | * | 9/2003 | Fries        | 269/309   |

* cited by examiner

*Primary Examiner* — Joseph J Hail
*Assistant Examiner* — Marc Carlson
(74) *Attorney, Agent, or Firm* — Maginot, Moore & Beck, LLP

(57) ABSTRACT

A clamping fixture comprises a clamping base member (1) and a workpiece pallet (2) for fixedly clamping thereto. The clamping base member (1) features a number of clamping spigots (43) corresponding in number to that of the clamping devices (5) for fixedly clamping in place in each clamping device (5). Arranged on the clamping base member (1) are first centering members (4) which cooperate with the further centering members (38) arranged on the workpiece pallet (2) such that the workpiece pallet (2) is aligned in place when fixedly clamping to the clamping base member in the X-direction and Y-direction. Each clamping device (5) features a clamping socket (6), the top side of which forms the Z-mount for the workpiece pallet (2). The Z-mount of the clamping base member (1) is formed by a plurality of face portions (11) topping each clamping socket (6), and wherein each face portion (11) is provided with at least one outflow port (12) for a cleaning medium. Each clamping socket (6) is provided with a hollow protuberance (10) extending down to the underside of the clamping base member (1).

16 Claims, 5 Drawing Sheets

CLAMPING FIXTURE

The present invention relates to a clamping fixture configured as set forth in the preamble of claim 1.

Such clamping fixtures are put to use for clamping tools, workpieces or workpiece pallets positionally defined, the clamping base member usually being fixedly located on a work table of a machine tool or a press whilst the workpiece pallet is repeatedly releasably located precisely positioned on the clamping clamping base member.

Known from EP 0 614 725 A1 is an apparatus in accordance with the invention for clamping a workpiece at a work station of a machine tool in a well defined position. This apparatus comprises a clamping base member to be fixed in the working area of the machine tool and a workpiece pallet adapted to be placed on the clamping base member and to be fixed thereto. In order to align the position of the workpiece pallet with respect to the clamping base member the latter features first aligning means in the form of centering ruler members whilst the workpiece pallet comprises further aligning means in the form of profiled plates machined with a groove. To locate the workpiece pallet on the clamping base member said centering ruler members engage the grooves in the profiled plates to position the workpiece pallet in the X- and Y-direction as well as relative to its position angular about the Z-axis. X-positioning is achieved by the workpiece pallet being drawn by means of clamping devices against the clamping base member until its face underside comes into contact with annular mounting face portions of the clamping base member. Although such a clamping fixture or apparatus has a proven record of success in practice there is a risk of dirt building up with time on the annular mounting face portions obstructing precise positioning of the workpiece pallet, especially in the Z-direction. In addition to this, dirt may also accummulate in the four clamping devices which, again, prevents proper functioning of each clamping device.

This is why the object of the present invention is to provide a clamping fixture for use in the aforementioned field of machining which is insensitive to becoming dirty so that the workpiece pallet can now be defined with repeated accuracy on the clamping base member.

Achieving this object is defined by features as set forth in claim 1. In accordance with the invention the clamping base member of the clamping fixture now features a number of clamping spigots corresponding in number to that of the clamping devices for fixedly clamping in place in each clamping device, wherein arranged on said clamping base member are first centering members which cooperate with the further centering members arranged at the workpiece pallet such that the workpiece pallet is aligned in place when fixedly clamped to the clamping base member in the X-direction and Y-direction, and wherein each clamping device now features a clamping socket, the top face of which forms the Z-mount for the workpiece pallet, the Z-mount of the clamping base member being formed by a plurality of face portions topping each clamping socket, and wherein each face is provided with at least one outflow port for a cleaning medium, and wherein each clamping spigot is provided with a hollow protuberance extending down to the underside of the clamping base member.

Configuring a clamping fixture in this way now makes it possible for the Z-mounts formed by defined face portions to be cleaned whilst any dirt tending to accumulate in the region of the clamping devices is now cleaned out from the bottom of the clamping base member. This is why a clamping fixture of this design is much less susceptible to becoming dirty which ultimately means that the workpiece pallet can now be repeatedly precisely positioned on the clamping base member even over a long period of time.

Preferred embodiments and further aspects of the subject matter of the invention read from the dependent claims.

Thus, in one particularly preferred aspect the clamping base member features a basic element and the workpiece pallet a main element wherein inserted in the basic element of the clamping base member are clamping sockets to form the Z-mounts of the clamping base member, and wherein annular elements are inserted in the main element of the workpiece pallet to form the Z-mounts of the workpiece pallet. This now makes it possible to make each Z-mount of a material which is specifically adapted to the wanted requirements. In addition to this, the elements of the clamping fixture not exposed to any particular stress, especially the basic element and the main element, can now be made of a relatively low-cost and, where necessary, lightweight material. In this respect it is proposed in a further particularly preferred embodiment to make the clamping sockets of a material harder than that of the basic element of the clamping base member whilst making the annular element of the workpiece pallet from a material harder than that of the main element of the workpiece pallet.

In another preferred aspect of the clamping fixture each clamping socket is engineered in one piece and featuring an annular circumferential shoulder, the underside of which is machined with an annular passageway connecting the outflow ports by means of drillings. This aspect permits a relatively simple configuration of the clamping socket because its outflow ports can be supplied with air via the annular passageway.

In another particularly preferred embodiment of the clamping fixture it is provided for that the workpiece pallet is adapted to the clamping base member such that on placement of the workpiece pallet on the clamping base member a gap ranging from 0.1 to 0.01 mm materializes between the face portions serving as Z-mounts and the Z-mounts of the workpiece pallet. This now makes it possible that the workpiece pallet has only to negotiate just a very small distance in the Z-direction to come into contact with the Z-mounts of the clamping base member during the clamping action. This is why when fixedly clamping the workpiece pallet the groove elements are diverted only slightly in the Z-direction enhancing highly precise alignment of the workpiece pallet relative to the clamping base member. This is because due to the very slight Z-shift of the workpiece pallet after alignment in the X-direction and Y-direction any possible source of error is practically eliminated and only relatively minor forces need to be overcome to pliantly deflect the groove elements in the Z-direction.

Further advantageous embodiments and feature combinations of the invention read from the following detail description and the entirety of the claims.

BRIEF DESCRIPTION OF THE DRAWINGS

The FIGS. in the drawings used to explain an example embodiment are as follows:

FIG. 2a is a magnified section taken from FIG. 2;

Referring now to FIG. 1 there is illustrated the main members of the clamping fixture in a view in perspective. The clamping fixture comprises a clamping base member 1, fixed in place in the region of a machine tool, as well as a workpiece pallet 2. The clamping fixture as shown serves in particular to fixedly clamp in place large and/or heavy workpieces in the working area of a machine tool, for instance a milling, grinding or spark erosion machine or lathe. Large and heavy in this context is understood to be workpieces as large as approx. 500×500×500 mm and weighting up to several hundred kilograms.

Figure 1:
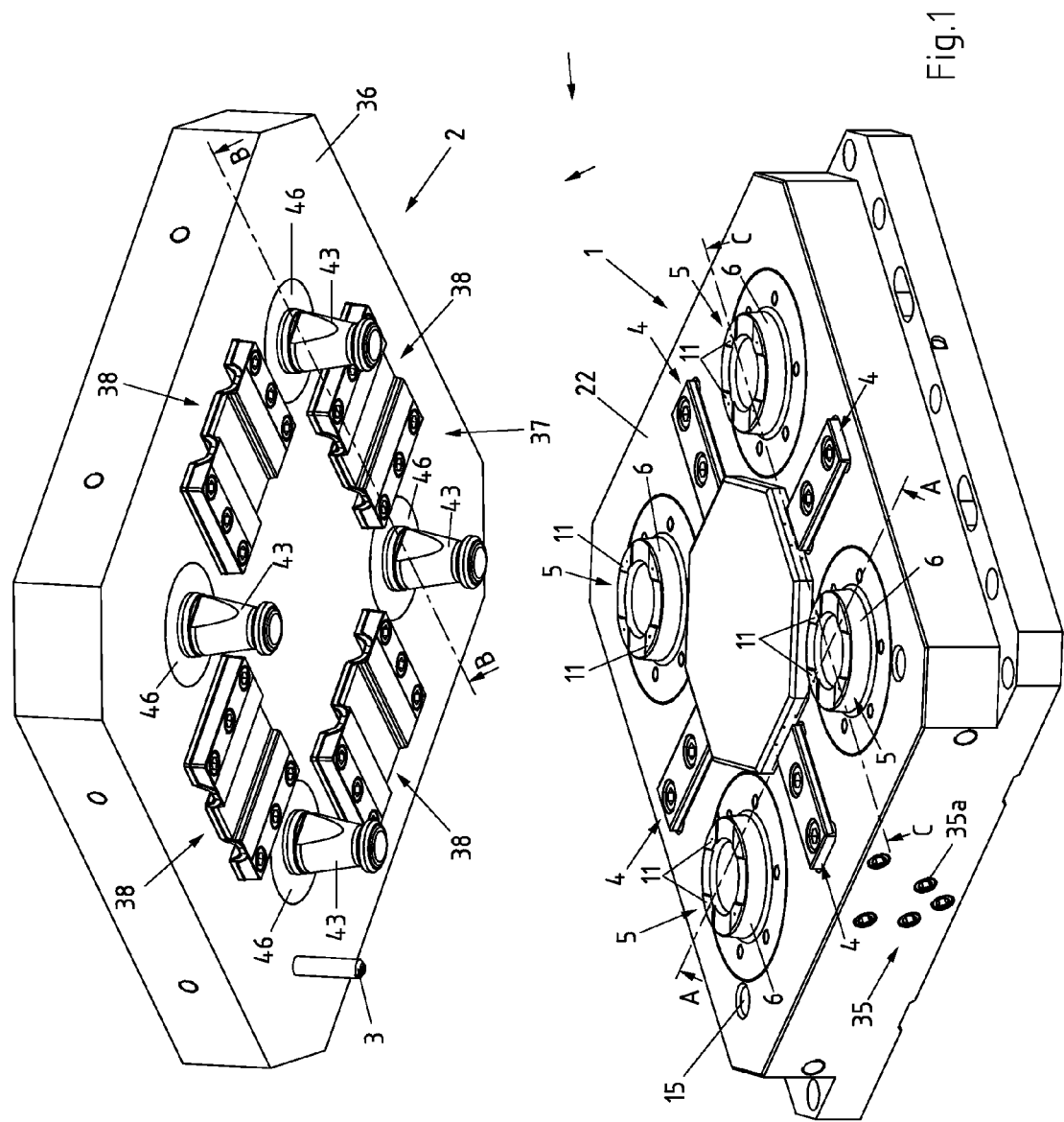
FIG. 1 is a view in perspective of the clamping fixture comprising a clamping base member and a workpiece pallet.

The clamping base member 1 features a basic element 22 mounting four clamping devices 5 whilst the workpiece pallet 2 comprises a main element 36 fitted with four clamping spigots 43 arranged correspondingly to the clamping devices and which can be fixedly clamped in place in the clamping devices 5. To achieve precise positioning of the workpiece pallet 2 on the clamping base member 1 the basic element of the clamping base member 1 features first centering elements in the form of four centering tangs 4 and the main element of the workpiece pallet 2 features further centering elements in the form of four groove elements 38. The groove elements 38 are configured such that their central portion provided with a centering groove is engineered deflectable in the Z-direction, i.e. in the direction of the underside 37 of the workpiece pallet 2 by a specific amount, preferably a few 100ths of a mm. The workpiece pallet 2 is provided with a face underside 37 to which the groove elements 38 are secured by being bolted thereto. Since the basic configuration of such a clamping fixture is known from EP 0 614 725 A1 the following details particular the features of the clamping fixture essential to the invention.

Each clamping device 5 of the clamping base member 1 includes clamping sockets 6 inserted in the basic element 22, the annular top face of which partly forms the Z-mount for the workpiece pallet 2. For this purpose each top face is machined with four elevated face portions 11 for mounting the workpiece pallet by face portions on being fixedly clamped in place. Each of the cited face portions 11 features an outflow port via which a cleaning medium, preferably air, can be jetted away. These elevated face portions 11 are ground flat with high precision. It is understood that instead of four elevated face portions 11 any other number and shape of such face portions may be provided.

In addition, the clamping base member 1 is provided with an indexing port 15 serving to receive an indexing pin 3 protruding from the workpiece pallet 2. This cooperation of the cited indexing means is intended to ensure that the workpiece pallet 2 is fixed in place always in the same angular position on the clamping base member 1.

Inserted in the main element 36 of the workpiece pallet 2 are annular elements 46 on the underside facing the clamping base member 1 to form Z-mounts, the annular elements 46 surrounding the rear footing of each clamping spigot 43 facing the underside 37 of the workpiece pallet 2. The cited annular elements 46 are made of a high-strength material, preferably hardened steel. How these annular elements 46 are secured and machined will now be explained in more detail.

The basic element 22 of the clamping base member 1 features a plurality of connecting passageways 35 via which media such as, for example, compressed air, etc. for operating the clamping devices 5 can be supplied. Via at least one of these connecting passageways 35 a cleaning medium—air—can be supplied to the outflow ports inset in the elevated face portions 11.

Figure 2:
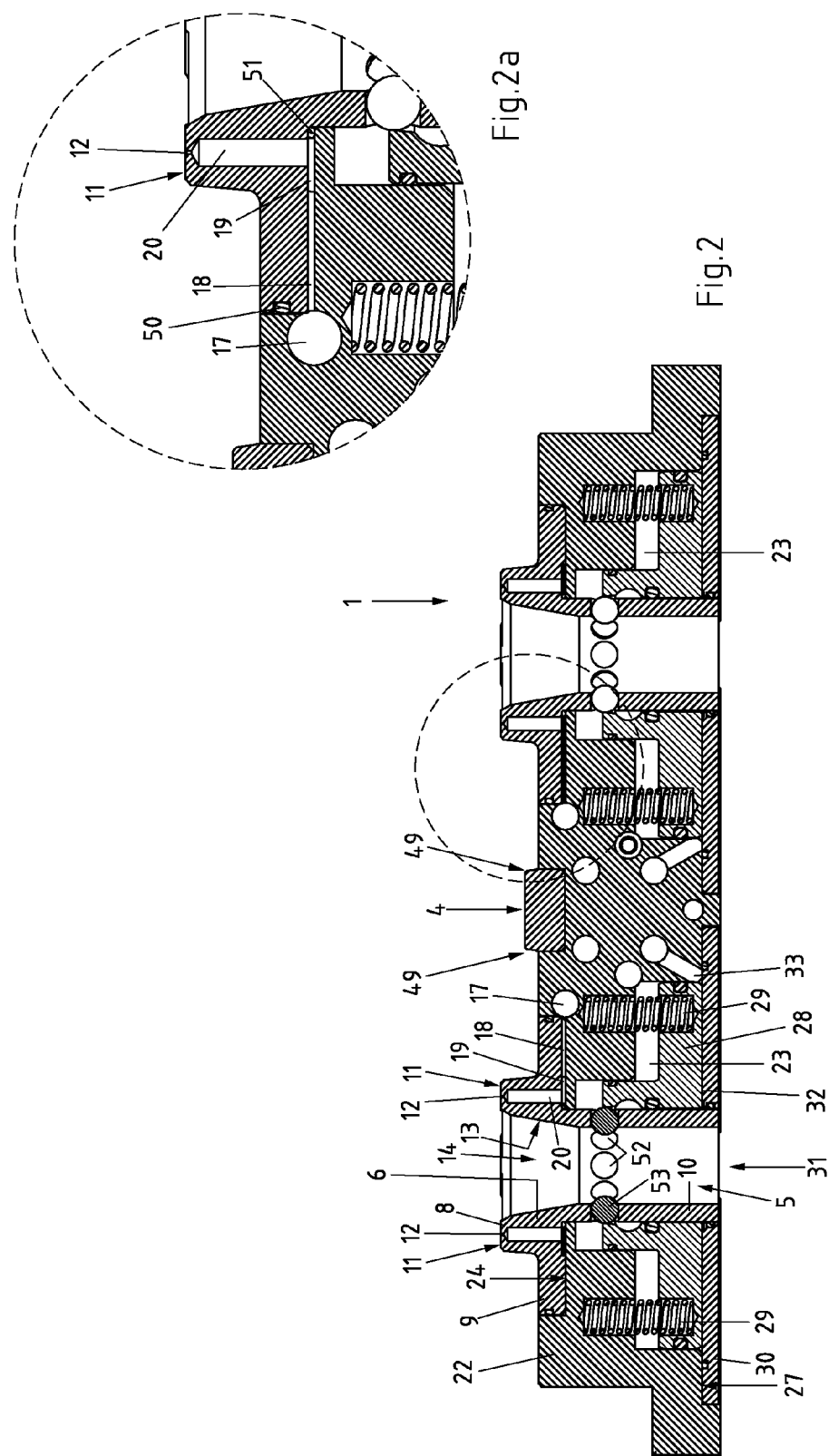
FIG. 2 is a cross-sectional view through the clamping base member.

Referring now to FIG. 2 there is illustrated a cross-section through the clamping base member 1 as taken along the line A-A. The basic element 22 is provided with four cavities 23, each devised for mounting one clamping device 5 each (only two of the four cavities 23 are evident in this FIG.) With reference to one of the four clamping devices—the left-hand clamping device 5 in this FIG.—the structure of one such clamping device 5 will now be explained in more detail.

Each clamping device 5 comprises a clamping socket 6 as well as a locking plunger 28, both of which are inserted in the cited cavities 23. The locking plunger 28 is configured in the form of an annular plunger surrounding the clamping socket 6 or its rear protuberance 10. Downwards, each cavity 23 is covered by means of a round cover plate 30, each of which is provided with a central opening 31, the function of which is explained in more detail below. As shown in this FIG. it is particular obvious that each clamping socket 6 is configured as a kind of bush comprising a full-length opening 14 extending through the whole clamping base member 1. The clamping socket 6 comprises substantially an upper part 8, an annular circumferential shoulder part 9 connecting the latter downwards and a tubular protuberance 10, the rear end of which extends up to the rear side of the clamping base member 1. The upper part 8 of the clamping socket 6 features at the inside a conical insertion portion 13. Each clamping socket 6 is supported by means of the annular circumferential shoulder part 9 to a first or topmost step 24 of each cavity 23. In this example the locking plunger 28 is shown in the lower locking position in which it urges the clamping balls 53 serving to lock a clamping spigot radially inwards. The locking plunger 28 is urged by compression springs 29 supported by the basic element 22 in the locking position as shown.

To urge the locking plunger 28 upwards in overcoming the force of the springs 29 a pressurized medium is introduced into an annular space 32 between the underside of the locking plunger 28 and the cover plate 30 (the means for achieving this not being shown). Only one passageway 33 leading into the cited annular space 32 is evident, via which the corresponding pressurized medium can be introduced. Each cover plate 30 is bolted (not shown) to a rear step 27 of each cavity 23 on the rear/lower side of the clamping base member 1. The annular space 32 is sealed by means of gaskets which are not detailed here.

The tubular protuberance 10 of the clamping socket 6 extends through the central opening 31 in the cover plate 30 down to the rear or lower side of the clamping base member 1, resulting in a through-port via which any dirt having collected can exit or be removed. However, for instance cooling water may flow downwards through the clamping socket 6.

Each clamping socket 6 is engineered in one piece, an annular passageway 19 being machined in the rear or underside of the annular circumferential shoulder part 9 to connect the outflow ports 12 merging into the elevated face portions 11 by means of axial drillings 20. The annular passageways of all clamping sockets 6 are connected to a connecting passageway merging from the basic element 22. The clamping socket 6 made of steel is hardened at least in the region of the face portions 11 serving as a Z-mount, preferably the whole clamping socket 6 being made of hardened steel.

As a result of elevated face portions 11 being utilized as Z-mounts a space remains between the face portions 11, especially from the surface of each clamping socket 6 being somewhat set back in the areas between the face portions 11. Unlike the Z-mounts configured as in prior art, all of which are formed annular and feature no cleaning ports, the Z-mounts in accordance with the invention are substantially less susceptible to becoming dirty, especially since the Z-mounts reduced in size also achieve a higher face pressure contact. This necessitates, however, that the corresponding mounting faces are engineered to handle the load, preferably by being very hard.

The clamping socket 6 is provided with a plurality of radial drillings 52 serving to receive the clamping balls 53. It is furthermore obvious that each centering tang 4 is seated in a groove machined in the top face of the basic element 22. These centering tangs 4 are bolted (not shown) to the basic element 22, they preferably in addition being bonded to each groove. Each centering tang 4 is configured with two slanting side faces 49 to serve centering.

Referring now to FIG. 2a there is illustrated a magnified section taken from FIG. 2 depicting in particular one of the vertically oriented drillings 20 leading to an outflow port 12 in one of the elevated face portions 11 of the clamping socket 6. The outflow port 12 itself has a relatively small cross-section as compared to that of the vertical drillings 20 as is evident from the high speed at which the air is jetted from the outflow port 12. Also evident in this FIG. is the annular passageway 19 which is connected to each outflow port 12 via the drilling 20. Likewise evident is the passageway 18 running radial relative to the annular passageway 19, it being this passageway 18 which connects the drilling 17 to the annular passageway 19. When, as in the present example, four face portions 11 are provided with outflow ports 12, each annular passageway 19 is connected via four vertically oriented drillings 20 to the four outflow ports 12.

Figure 3:
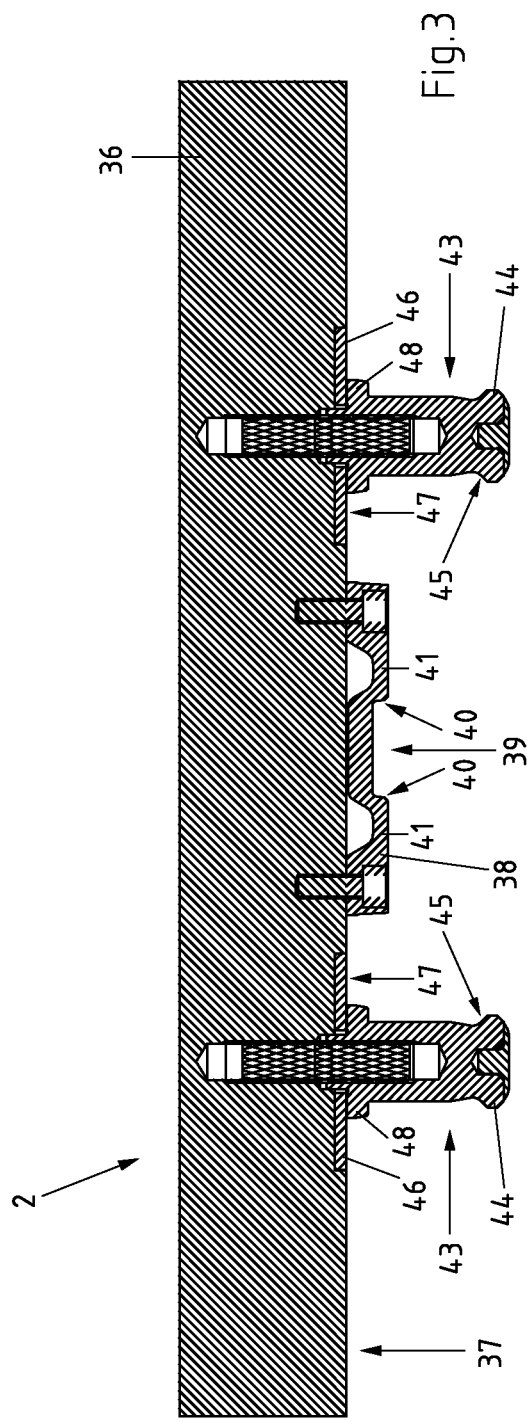
FIG. 3 is cross-sectional view through the workpiece pallet.

Referring now to FIG. 3 there is illustrated a cross-sectional view through the workpiece pallet 2 taken along the line B-B as shown in FIG. 1. Secured to the underside 37 of the main element 36 are both the clamping spigots 43 as well as the groove elements 38. Furthermore evident from this section illustration are the Z-mounting faces 47 formed by annular disc-shaped annular elements 46 machined in the underside of the main element 36. These annular elements 46 are made of hardened steel whilst the main element 36 of the workpiece pallet 2 itself is made of a softer and lighter material, for example, aluminum. This is also important since the Z-mounting faces 47 are relatively small and with a non-hardened material there would be a risk of the Z-mounts being elastically and/or plastically deformed due to the high clamping forces. The middle portion of each main element 36 featuring the centering groove 39 is supported on the main element 36 via two radial oriented tangs 41. As already mentioned, the middle portion of the groove elements 38 is engineered pliant by a few 100ths of a mm in the Z-direction. Configuring these tangs 41, especially as regards their thickness, length, width and their material enables the force for deflecting the middle portion—groove 39—to be determined in the Z-direction.

To secure the annular element 46 to the main element 36 it is firstly inserted in a recess designed to seat the annular element 46 on the underside 37 of the workpiece pallet 2. Preferably, the annular element 46 is bonded in the cited recess. After this, the annular element 46 and also the underside 37 in the workpiece pallet 2, where provided for, are ground flat. The clamping spigots 43 are then bolted to the main element 36 of the workpiece pallet 2. The annular element 46 has a central cavity, the diameter of which is slightly larger than a centering collar arranged on the rear side of the clamping spigot 43. In securing each clamping spigot 43 the corresponding annular element 46 is additional fixed in place by an enlarged diameter footing 48 of the clamping spigot 43.

Fixedly bonding the annular elements 46 to the main element 36 of the workpiece pallet 2 ensures that their location and shape are no longer varied when bolting the clamping spigots 43 fixed in place which is important since each underside of the annular elements 46 forms, after grinding, a defined highly precise Z-mount.

The centering elements dictating centering in the X-direction and Y-direction, namely the centering tangs 4 and the groove elements 38 are adapted to each other such that on placement of the workpiece pallet 2 on the clamping base member 1 a gap ranging from 0.1 to 0.01 mm, preferably a gap ranging from 0.02 to 0.04 mm, materializes between the Z-mounts of the clamping base member 1—elevated face portions 11—and the Z-mounts of the workpiece pallet 2—annular Z-mounting faces 47. Placement of the workpiece pallet 2 on the clamping base member 1 is understood to mean that the workpiece pallet 2 is located on the clamping base member 1 by its own weight, or, at the most, together with a workpiece secured thereto. In this context this is also termed placement of the workpiece pallet 2 on the clamping base member 1 free of any tensioning. But in any case the groove elements 38 are adapted to a maximum weight of the workpiece to be secured to the workpiece pallet 2 amounting to several hundred kilograms, for example, such that even after placement of the workpiece pallet 2 together with the workpiece secured thereto there still exists a gap between the Z-mounts of the clamping base member 1 and the Z-mounting faces of the workpiece pallet 2.

Figure 4:
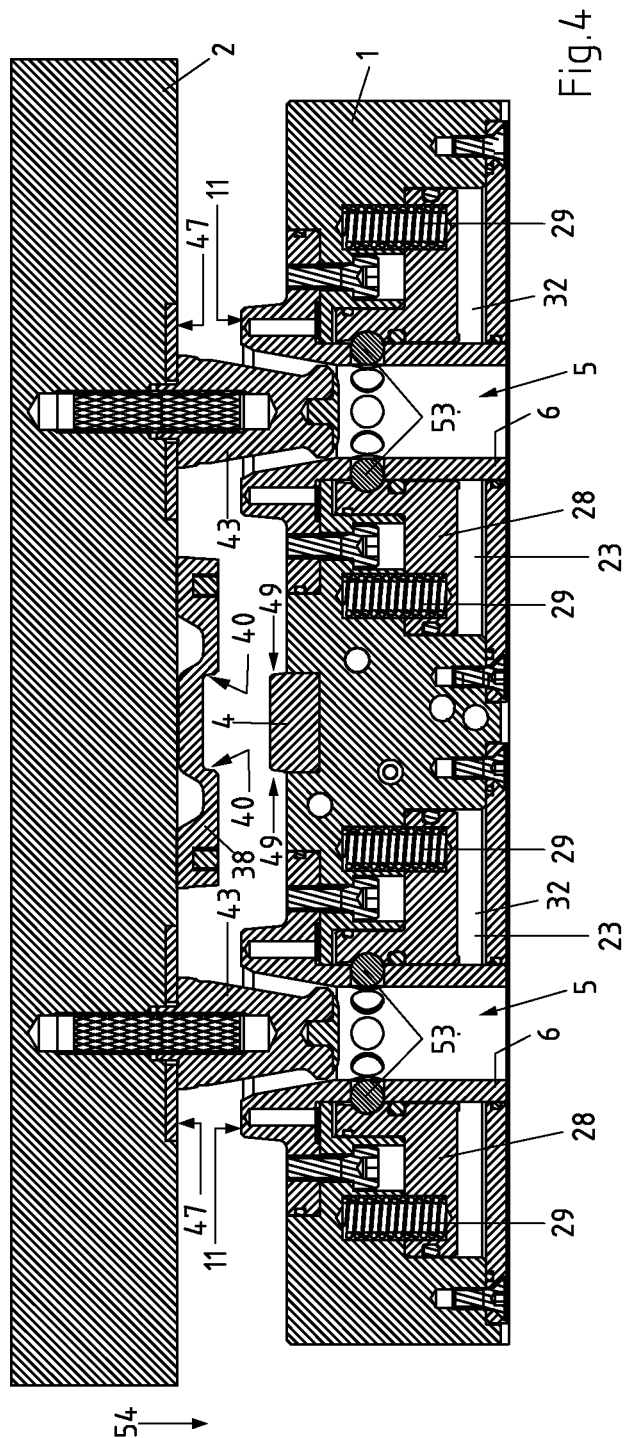
FIG. 4 is an illustration of the workpiece pallet during placement on the clamping base member.

Referring now to FIG. 4 there is illustrated how the workpiece pallet 2 is placed on the clamping base member 1 shown in a section taken along the line C-C in FIG. 1. So that each clamping spigot 43 is inserted into the corresponding clamping socket 6 of the clamping fixture for being fixedly clamped in place, each locking plunger 28 must be located in the unlocked position as shown in which the clamping balls 53 are in the retracted position for being urged radially outwards at least by each clamping spigot 43 on being inserted. In the unlocked position of the locking plunger 28 corresponding to the upper top position thereof the clamping balls 53 are able to become seated in an annular groove of the locking plunger 28. The locking plungers 28 are urged pneumatically upwards into the position as shown in overcoming the bias force of the compression springs 29 on application of a pressurized medium—compressed air—into the annular space 32. It is in this upper end position that each locking plunger 28 is supported by its top face at a further step of each cavities 23 serving as a stopper.

The workpiece pallet 2 is then lowered in the Z-direction until the centering tangs 4 engage the groove elements 38, more particularly, the slanting side walls 40 of groove elements 38 come into contact with the slanting side faces 49 of the centering tangs 4. Once the workpiece pallet 2 is placed on the clamping base member 1 the workpiece pallet 2 is aligned relative to the clamping base member 1 in the X-direction and Y-direction as well as relative to the angular position about the Z-axis oriented vertical to the Z-mounting faces, leaving merely the Z-positioning to be concluded since a gap ranging from 0.1 to 0.01 mm exists between the elevated face portions 11 of each clamping socket and the underside of the corresponding annular elements 46 of the workpiece pallet 2 serving as the Z-mounting face 47. The Z-direction is indicated by the arrow 54.

Preferably, after placement of the workpiece pallet 2 on the clamping base member 1 air is jetted via the outflow ports into the elevated face portions 11. The air emerging with a high jetting velocity cleans the annular Z-mounting faces 47 of the workpiece pallet 2 as well as the elevated face portions 11 of the clamping base member 1. Preferably the air feeder features a pressure or flow sensor (not shown) by means of which which it can be ascertained whether or not the workpiece pallet 2 is fixedly clamped to the clamping base member 1 correctly, since thereafter the air outlet ports are closed off by each Z-mounting face 47 of the workpiece pallet 2 once the latter has been fixedly clamped in place as is signalled by the sensor.

The cited gap between the Z-mounts is eliminated when fixedly clamping the workpiece pallet 2 in place by the latter being drawn in the direction of the clamping base member 1 by the four clamping devices 5 arranged on the clamping base member 1. For this purpose the pneumatic overpressure is reduced in each annular space 32 by opening a valve (not shown) until the pressure has adapted to the ambient pressure. The force of the compression springs 29 urges each locking plunger 28 downwards, as a result of which the clamping balls 53 are shifted radially inwards. In this arrangement the clamping balls 53 come into contact with the slanting face 45 on the header 44 of each clamping spigot 43 (see FIG. 3), pulling it downwards to the extent that that the cited gap between the Z-mounts 11, 47 is eliminated. Pulling down the workpiece pallet 2 also causes pliant deflection of the groove elements 38.

Figure 5:
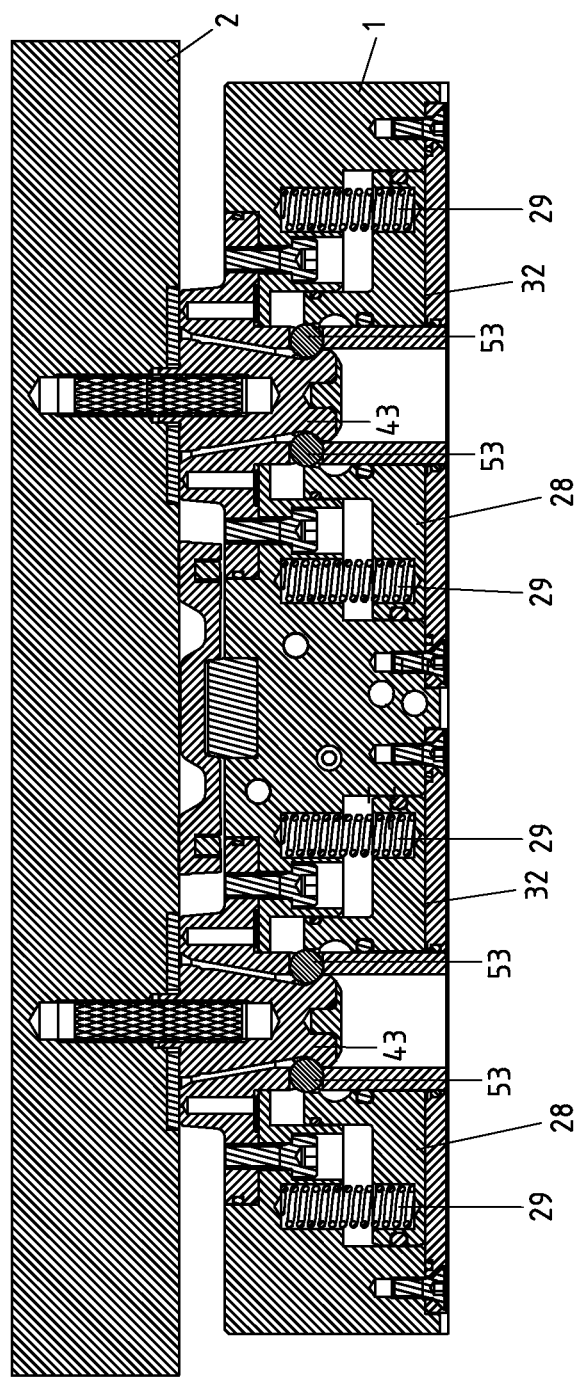
FIG. 5 is an illustration of the workpiece pallet fixedly clamped in place.

Once each annular space 32 has zero pressure the locking plungers 28 are urged downwards into the locking position by the bias force of the compression springs 29 so that the workpiece pallet 2 is fixedly clamped to the clamping base member 1 and locked in place due to the clamping balls 53 each arresting the clamping spigots 43. This condition of being fixedly clamped in place is illustrated in FIG. 5.

To ensure the cited gap ranging from 0.1 to 0.01 mm between the Z-mounting faces 11 of the clamping base member 1 and the Z-mounting faces 47 of the workpiece pallet 2 after placement of the workpiece pallet 2 on the clamping base member 1 the cited Z-mounts, namely the elevated face portions 11 topping each clamping socket 6 and the underside of the annular elements 46 forming an annular Z-mounting faces 47 need to be machined and ground flat with high precision. This also applying, at the other hand, to the groove elements 38, namely the side walls 40 thereof and the side faces 49 of the centering elements in being adapted to each other so that the position and mass of the grooves 39 corresponds to a predetermined value in being precisely adapted to the centering tangs 4 arranged on the clamping base member 1.

Due to the slight gap between the Z-mounts after placement of the workpiece pallet 2 on the clamping base member 1 it is achieved that the workpiece pallet 2 only needs to cover a very minor distance in the Z-direction during the clamping action until coming into contact with the Z-mounts 11 of the clamping base member 1. This in turn has the advantage that also the groove elements 38 need to be pliantly deflected only to a very minor degree in the Z-direction, namely by the amount of the gap between the Z-mounts. This now promotes aligning the workpiece pallet 2 relative to the clamping base member 1 with high precision since the very minor shift in the Z-direction of the workpiece pallet 2 after alignment in the X-direction and Y-direction practically eliminates any source of error.

Providing separate centering elements in the form of centering tangs 4 and groove elements 38 as shown has the advantage that these can be made of a material which is specifically in keeping with the wanted requirements. Indeed, this also has the further advantage that, in addition, each basic element 22 of the clamping base member 1 or main element 36 of the workpiece pallet 2 can now be made of a material having the wanted properties, preferably at low cost and facilitated. Whilst the centering elements are preferably made of a hard and tough material such as hardened steel, preferably unhardened steel finding application as the basic material for the basic element 22 of the clamping base member 1, the main element 36 of the workpiece pallet 2 is preferably made of aluminum or an alloy thereof.

Thus it can be summarized that the clamping fixture configured in accordance with the invention now ensures highly precise positioning of the workpiece pallet 2 on the clamping base member 1 with absolute certainty and repeatedly. This is achieved, for one thing, because the Z-mounts are cleaned during the clamping action. For another, the centering elements after being secured in place are machined to high precision and adapted to each other such that the workpiece pallet after placement on the clamping base member 1 is now positioned in the X-direction and Y-direction as well as regarding the angular position about the Z-axis, a gap ranging from 0.1 to 0.01 mm, preferably ranging from 0.02 to 0.04 mm, now existing between the Z-mounts, namely between the the elevated face portions 11 of the clamping base member 1 and the annular Z-mounting faces 47 of the workpiece pallet 2. This means that in the subsequent clamping action now merely serving to position the workpiece pallet in the Z-direction in definitively defining its position on the clamping base member 1, the workpiece pallet merely has to cover a distance in the magnitude of the cited gap. The fact that the shift in the position of the workpiece pallet in the Z-direction is now just a minimum after positioning in the X-direction and/or Y-direction practically eliminates any source of error. In addition to this, as a result of the slight shift the pliant groove elements now need to be deflected on the workpiece pallet only to a minor extent evident by a relatively slight resistance in the Z-direction coupled with high precision and a long useful life when fixedly clamping the items in place.

It is to be noted that when stating the positioning of the workpiece pallet on the clamping base member 1 to be highly precise the clamping fixture configured in accordance with the invention is intended to achieve a repeatable accuracy of better than 2 microns.

What is claimed is:

1. A clamping fixture comprising a clamping base member (1) for fixedly clamping in place a workpiece pallet (2), said clamping base member (1) including a bottom face for mounting on a surface of a machine tool and including a number of clamping devices (5) on a top face thereof opposite said bottom face, and said workpiece pallet (2) including a number of clamping spigots (43) corresponding in number to that of the clamping devices (5) for fixedly clamping in place in each clamping device (5), and wherein arranged on said clamping base member (1) are first centering members (4) which cooperate with the further centering members (38) arranged on said workpiece pallet (2) such that said workpiece pallet (2) is aligned in place when fixedly clamping to said clamping base member in the X-direction and Y-direction, and wherein each clamping device (5) features a clamping socket (6), the top face of which forms the Z-mount for said workpiece pallet (2), characterized in that said Z-mount of said clamping base member (1) is formed by a plurality of discrete face portions (11) elevated from a top surface of each clamping socket (6), and wherein each face portion (11) is provided with at least one outflow port (12) opening at each face portion for a cleaning medium, and wherein each clamping socket (6) is provided with a hollow protuberance (10) extending down to the bottom face of said clamping base member (1).

2. The clamping fixture as set forth in claim 1, characterized in that said clamping base member (1) features a basic element (22) and said workpiece pallet (2) a main element (36) wherein inserted in said basic element (22) of said clamping base member (1) are clamping sockets (6) to form the Z-mounts of said clamping base member (1), and wherein annular elements (46) are inserted in said main element (36) of said workpiece pallet (2) to form the Z-mounts of said workpiece pallet (2).

3. The clamping fixture as set forth in claim 2, characterized in that said clamping sockets (6) are made of a material harder than that of said basic element (22) of said clamping base member (1) whilst making the annular elements (46) of said workpiece pallet (2) from a material harder than that of the main element (36) of said workpiece pallet (2).

4. The clamping fixture as set forth in claim 1, characterized in that each clamping socket (6) is engineered in one piece and featuring an annular circumferential shoulder (9), the underside of which is machined with an annular passageway (19) connecting the outflow ports (12) by means of drillings (20).

5. The clamping fixture as set forth in claim 4, characterized in that said basic element (22) of said clamping base member (1) is provided with cavities (23) for receiving said clamping sockets (6), each cavity (23) having a first step (24) forming a face for supporting said shoulder part (9) of each clamping socket (6).

6. The clamping fixture as set forth in claim 1, characterized in that said clamping base member (1) comprises four clamping devices (5) and said workpiece pallet (2) comprises four clamping spigots (43).

7. The clamping fixture as set forth in claim 6, characterized in that said basic element (22) of said clamping base member (1) is provided with cavities (23) for receiving said clamping sockets (6), each cavity (23) having a first step (24) forming a face for supporting said shoulder part (9) of each clamping socket (6).

8. The clamping fixture as set forth in claim 1, characterized in that said basic element (22) of said clamping base member (1) is provided with at least one connecting passageway (35*a*) porting outwards and connecting said annular passageways (19) of all clamping sockets (6).

9. The clamping fixture as set forth in claim 8, characterized in that said basic element (22) of said clamping base member (1) is provided with cavities (23) for receiving said clamping sockets (6), each cavity (23) having a first step (24) forming a face for supporting said shoulder part (9) of each clamping socket (6).

10. The clamping fixture as set forth in claim 8, characterized in that said connecting passageways (35*a*) port outwards at the side and/or underside of said basic element (22).

11. The clamping fixture as set forth in claim 10, characterized in that said basic element (22) of said clamping base member (1) is provided with cavities (23) for receiving said clamping sockets (6), each cavity (23) having a first step (24) forming a face for supporting said shoulder part (9) of each clamping socket (6).

12. The clamping fixture as set forth in claim 1, characterized in that said first centering members arranged on said clamping base member (1) are configured in the form of centering tangs (4) and the further centering members arranged at the workpiece pallet (2) are configured in the form of groove elements (38) pliantly engineered in the Z-direction.

13. The clamping fixture as set forth in claim 12, characterized in that on placement of said workpiece pallet (2) on said clamping base member (1) said groove elements (38) arranged on said workpiece pallet (1) come into contact with said centering tang (4) arranged on said clamping base member (1).

14. The clamping fixture as set forth in claim 13, characterized in that said groove elements (38) comprise slanting side walls (40) serving as centering faces and said centering tangs (4) corresponding to said side walls (40) comprise side faces (49) serving as centering faces.

15. The clamping fixture as set forth in claim 1, characterized in that said workpiece pallet (2) is adapted to said clamping base member (1) such that after placement of said workpiece pallet (2) on said clamping base member (1) a gap ranging from 0.1 to 0.01 mm exists between said face portions (11) of said clamping base member (1) serving as Z-mounts and Z-mounting faces (47) of said workpiece pallet 2.

16. The clamping fixture as set forth in claim 1, characterized in that each clamping device (5) of said clamping base member (1) includes a locking plunger (28) for actuating clamping balls (53) for fixedly clamping a clamping spigot (43) in place, each locking plunger (28) being configured as an annular plunger surrounding each protuberance (10) of a clamping socket (6) and which is biased by means of compression springs (29) supported on said basic element in the direction of the underside of said clamping base member (1).

* * * * *